3,056,782
ALKYL AND ALKOXY DERIVATIVES OF 5,7-DIALKYL-6,8-DIOXO - 5,6,7,8 - TETRAHYDRO-1,2,3-TRIAZINO[5,4-d]PYRIMIDINES

Viktor Papesch, Morton Grove, Ill., assignor to G. D. Searle & Co., Chicago, Ill., a corporation of Delaware
No Drawing. Filed Dec. 16, 1960, Ser. No. 76,133
8 Claims. (Cl. 260—249.5)

The present invention relates to a novel group of heterocyclic compounds which are alkyl and alkoxy derivatives of 5,7-dialkyl-6,8-dioxo-5,6,7,8-tetrahydro-1,2,3-triazino-[5,4-d]pyrimidines. The compounds can be represented by the following general formula

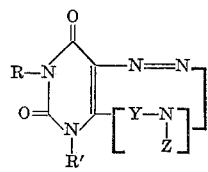

wherein

is taken from the group consisting of

and

and R, R', and R'' are lower alkyl radicals. The compounds are 3,5,7-trialkyl-4,6,8-trioxo-3,4,5,6,7,8-hexahydro-1,2,3-triazino[5,4-d]pyrimidines

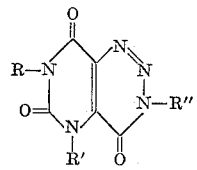

and 4-alkoxy-5,7-dialkyl-6,8-dioxo-5,6,7,8-tetrahydro-1,2,3-triazino[5,4-d]pyrimidines.

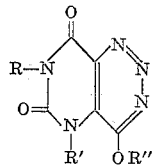

To prepare the compounds of this invention, an appropriate 1,3-dialkyl-6-methyluracil is nitrated with a mixture of fuming nitric acid and sulfuric acid and the resultant 5-nitro compound is reduced catalytically using palladium on charcoal catalyst to give the corresponding 1,3-dialkyl-5-amino-6-methyluracil. Diazotization of the amine brings about ring closure and yields the corresponding 5,7-dialkyl-6,8-dioxo-5,6,7,8-tetrahydro-1,2,3-triazino-[5,4-d]pyrimidine-3N-oxide.

When the above compound is allowed to react with thionyl chloride at room temperature and the product is isolated and purified under essentially anhydrous conditions, the 4-chloro-5,7-dialkyl-6,8-dioxo-5,6,7,8-tetrahydro-1,2,3-triazino[5,4-d]pyrimidine is obtained. It has the formula

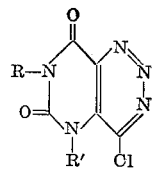

If, however, this product is allowed to react with hydrochloric acid, the corresponding 5,7-dialkyl-4,6,8-dioxo-3,4,5,6,7,8-hexahydro-1,2,3-triazino[5,4-d]pyrimidine is obtained. It has the following structural formula

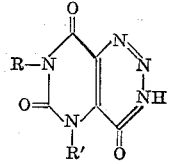

Reaction of the 4-chloro compound with an alkali metal alkoxide such as sodium methoxide in an excess of the corresponding alcohol yields the corresponding 4-alkoxy-5,7 - dialkyl - 6,8 - dioxo - 5,6,7,8 - tetrahydro - 1,2,3 - triazino[5,4-d]pyrimidine which has the following structural formula

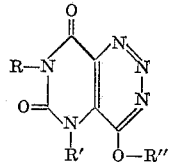

The 3-alkyl-4-oxo compounds can be prepared by reacting the 5,7-dialkyl-4,6,8-trioxo-3,4,5,6,7,8-hexahydro-1,2,-3-triazino[5,4-d]pyrimidine with an alkylating agent. These compounds can be represented by the following structural formula

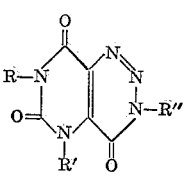

The compounds of this invention are antibacterial agents as shown by the fact that they inhibit the growth of *Diplococcus pneumoniae*. The 3-alkyl-4-oxo compounds are also inhibitors of seed germination as demonstrated by an inhibition of germination of seeds of Poaceae.

The 5,7-dialkyl-4,6,8-trioxo-3,4,5,6,7,8-hexahydro-1,2,-3-triazino[5,4-d]pyrimidines are useful as intermediates in the preparation of the 3,5,7-trialkyl-4,6,8-trioxo-3,4,-5,6,7,8-hexahydro-1,2,3-triazino[5,4-d]pyrimidines; they also act as inhibitors of seed germination as demonstrated by an inhibition of germination of seeds of Trifolium.

The compounds which constitute this invention and the methods for their preparation will appear more fully from a consideration of the following examples, which are given for the purpose of illustration only and are not to be construed as limiting the invention in spirit or scope.

3

In these examples, quantities are indicated in parts by weight and temperatures are expressed in degrees centigrade (° C.).

*Example 1*

A mixture of 71.8 parts of concentrated sulfuric acid and 2.25 parts of fuming nitric acid is cooled to 10° C. To this solution is added with stirring 12.7 parts of 1,3,6-trimethyluracil while the temperature is maintained at 10–20° C. When solution is complete, 7.8 additional parts of fuming nitric acid is added while keeping the temperature at 10–20° C.

The solution is poured onto ice and allowed to stand for 1.5 hours. The precipitate is filtered and washed with ice water. The solid is recrystallized from 50% ethanol to give 1,3,6-trimethyl-5-nitrouracil melting at about 153–154° C.

*Example 2*

A mixture of 36 parts of 1,3,6-trimethyl-5-nitrouracil and 3.6 parts of 5% palladium on charcoal in 1000 parts of water is hydrogenated for 2 hours in a bomb at 70–99° C. and 37–50 atmospheres. The resultant solution is filtered, concentrated to 125 parts under reduced pressure, cooled, and filtered. This yields 1,3,6-trimethyl-5-aminouracil melting at about 169–171° C.

*Example 3*

A solution of 29.8 parts of 1,3,6-trimethyl-5-aminouracil in 292 parts of concentrated hydrochloric acid and 190 parts of ice is stirred and cooled to 0–5° C. Twenty-five parts of sodium nitrite in 41.5 parts of water is slowly introduced below the surface of the amine hydrochloride solution. When the addition is complete, stirring is continued for an additional 1.5 hours and the mixture is allowed to warm to room temperature. The precipitate is filtered, washed with water and with ethanol, and dried in a vacuum desiccator to give 5,7-dimethyl-6,8-dioxo-5,6,7,8- tetrahydro-1,2,3-triazino[5,4-d]pyrimidine-3N-oxide melting at about 249–250° C. after recrystallization from acetic acid. It has the formula

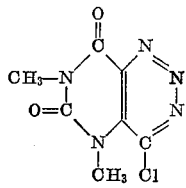

*Example 4*

Seventy parts of 5,7-dimethyl-6,8-dioxo-5,6,7,8-tetrahydro-1,2,3-triazino[5,4-d]pyrimidine-3N-oxide and 2296 parts of thionyl chloride are stirred overnight. The excess thionyl chloride is removed under reduced pressure at a temperature below 35° C. The residue is pulverized, spread on a plate and left under reduced pressure for 2 days in a vacuum desiccator. The crude material is recrystallized twice from 5% ethyl acetate in benzene and twice from methanol. Further purification gives 4-chloro-5,7-dimethyl-6,8-dioxo-5,6,7,8-tetrahydro - 1,2,3 - triazino-[5,4-d]pyrimidine melting at about 165–166° C. It has the formula

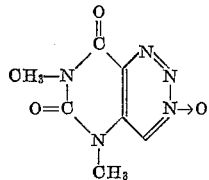

*Example 5*

A suspension of 1.1 parts of 4-chloro-5,7-dimethyl-6,8-dioxo-5,6,7,8-tetrahydro-1,2,3-triazino[5,4-d] - pyrimidine in 39.5 parts of methanol is stirred in an ice bath. A solution of 0.25 part of sodium methoxide in 2.4 parts of methanol is added portionwise. The mixture is stirred for 15 minutes. The precipitate is filtered and recrystallized from water to yield 4-methoxy-5,7-dimethyl-6,8-dioxo-5,6,7,8 - tetrahydro - 1,2,3 - triazino[5,4-d]pyrimidine melting at about 187–189° C. with decomposition. This compound has the following structural formula

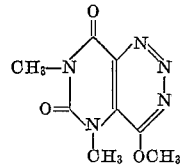

*Example 6*

A mixture of 15 parts of 5,7-dimethyl-6,8-dioxo-5,6,7,8-tetrahydro-1,2,3-triazino[5,4-d]pyrimidine-3N-oxide and 246 parts of thionyl chloride is stirred at room temperature for about 18 hours. Excess thionyl chloride is removed under reduced pressure while the vessel is at room temperature. The residue is dissolved in 1584 parts of benzene. The solution is chromatographed on a column containing 800 parts of silica. Elution is carried out with benzene containing increasing amounts of ethyl acetate. At 75% ethyl acetate, crude 4,6,8-trioxo-5,7-dimethyl-3,4,5,6,7,8-hexahydro-1,2,3 - triazino[5,4-d]pyrimidine is obtained. After recrystallization from ethyl acetate, the product melts at about 202–203° C. It has the formula

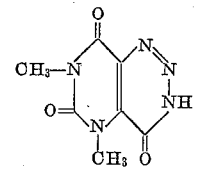

*Example 7*

To a suspension of 1.6 parts of 4,6,8-trioxo-5,7-dimethyl-3,4,5,6,7,8-hexahydro-1,2,3-triazino[5,4-d]pyrimidine in 15.8 parts of methanol and 8 parts of water is added 10.6 parts of dimethyl sulfate and then 3 parts of 10% sodium hydroxide solution portionwise with stirring. The resultant solution is concentrated to a small volume on a steam bath. The mixture is cooled and filtered and the precipitate is recrystallized from water to give 3,5,7-trimethyl-4,6,8-trioxo-3,4,5,6,7,8-hexahydro-1,2,3-triazino-[5,4-d]pyrimidine melting at about 174° C. with decomposition. This compound has the following formula

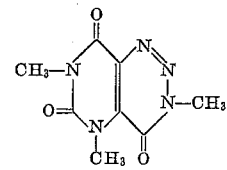

*Example 8*

A mixture of 59.8 parts of concentrated sulfuric acid and 3 parts of fuming nitric acid is cooled in an ice bath. To this solution is slowly added with stirring 12.5 parts of finely powdered 1,3-diethyl-6-methyluracil while the temperature is maintained at 10–15° C. When solution is complete, 6.8 additional parts of fuming nitric acid is added while maintaining the temperature below 15° C.

The solution is poured onto ice and stirred to promote crystallization. The precipitate is filtered, washed with ice water and recrystallized from 70% ethanol to give 1,3-diethyl-5-nitro-6-methyluracil melting at about 85–86° C.

*Example 9*

A mixture of 27 parts of 1,3-diethyl-5-nitro-6-methyluracil and 3 parts of 5% palladium on charcoal in 800 parts of absolute ethanol is stirred at room temperature and a pressure of 34 atmospheres until no further pressure drop is noted. The resultant mixture is filtered, and the filtrate concentrated to about 80 parts under reduced pressure, cooled, and filtered to yield 1,3-diethyl-5-amino-6-methyluracil melting at about 95–96° C.

*Example 10*

A solution of 16.8 parts of 1,3-diethyl-5-amino-6-methyluracil in 124 parts of 10% hydrochloric acid and 98 parts of crushed ice is stirred and cooled in an ice bath. A solution of 12.1 parts of sodium nitrite in 20 parts of water is added slowly; a precipitate forms. Stirring is continued for 15 minutes after the addition is complete. The suspension is filtered and the precipitate is washed with cold water, absolute alcohol and anhydrous ether. Recrystallization from absolute alcohol yields 5,7-diethyl-6,8-dioxo-5,6,7,8-tetrahydro-1,2,3-triazino - [5,4-d]pyrimidine-3N-oxide melting at about 244–245° C. with decomposition. It has the formula

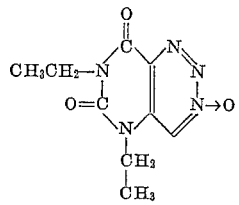

*Example 11*

A mixture of 5 parts of 5,7-diethyl-6,8-dioxo-5,6,7,8-tetrahydro-1,2,3-triazino-[5,4-d]pyrimidine-3N-oxide and 82 parts of thionyl chloride is stirred overnight at room temperature. The excess thionyl chloride is removed under reduced pressure while the temperature is maintained below 35° C. The residual solid is treated with 5% hydrochloric acid, warmed on a steam bath and filtered. The solid residue is treated with chloroform and a small amount of insoluble material is filtered off. The solution is dried over sodium sulfate and evaporated to dryness. The crude product is purified by repeatedly dissolving it in about 4 parts of ethyl acetate and then adding about 10 parts of anhydrous ether. This gives 4-chloro-5,7-diethyl-6,8-dioxo-5,6,7,8-tetrahydro- 1,2,3-triazino[5,4-d]pyrimidine melting at about 137–138° C. with decomposition. It has the formula

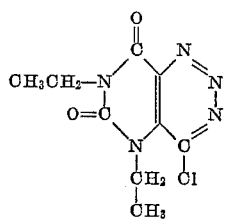

*Example 12*

A mixture of 5 parts of 5,7-diethyl-6,8-dioxo-5,6,7,8-tetrahydro-1,2,3-triazino[5,4-d]pyrimidine-3N-oxide and 82 parts of thionyl chloride is stirred overnight at room temperature. The excess thionyl chloride is removed under reduced pressure while the temperature is maintained below 35° C. The residue is treated with 5% hydrochloric acid, warmed on a steam bath, and filtered. The filtrate is concentrated to about 10 parts under reduced pressure and filtered. The precipitate is recrystallized from 40 parts of water to give 5,7-diethyl-4,6,8-trioxo-3,4,5,6,7,8-hexahydro-1,2,3-triazino[5,4-d]pyrimidine melting at about 190–191° C.

*Example 13*

To a suspension of 1 part of 5,7-diethyl-4,6,8-trioxo-3,4,5,6,7,8-tetrahydro-1,2,3-triazino[5,4-d]pyrimidine in 9.9 parts of methanol and 5 parts of water is added 0.67 part of dimethyl sulfate. With stirring at room temperature, 1.8 parts of 10% sodium hydroxide solution is added portionwise. The solution is filtered and concentrated on a steam bath until crystallization starts. The precipitate is filtered and recrystallized from water to yield 3-methyl-5,7-diethyl-4,6,8-trioxo - 3,4,5,6,7,8 - hexahydro - 1,2,3-triazino[5,4-d]pyrimidine melting at about 151–152° C. with decomposition. It has the following structural formula

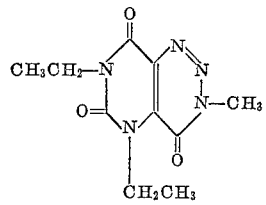

What is claimed is:
1. A compound of the formula

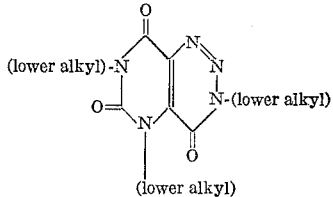

2. 3,5,7-trimethyl-4,6,8-trioxo-3,4,5,6,7,8-hexahydro-1,2,3-triazino-[5,4-d]pyrimidine.
3. 3-methyl-5,7-diethyl-4,6,8-trioxo-3,4,5,6,7,8-hexahydro-1,2,3-triazino[5,4-d]pyrimidine.
4. A compound of the formula

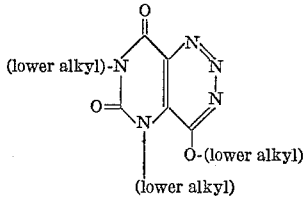

5. 4-methoxy-5,7-dimethyl-6,8-dioxo-5,6,7,8-tetrahydro-1,2,3-triazino[5,4-d]pyrimidine.
6. A compound of the formula

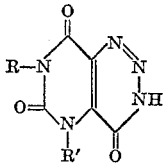

wherein R and R' are lower alkyl radicals.
7. 5,7-dimethyl-4,6,8-trioxo-3,4,5,6,7,8-hexahydro-1,2,3-triazino[5,4-d]pyrimidine.
8. 5,7-diethyl-4,6,8-trioxo-3,4,5,6,7,8-hexahydro-1,2,3-triazino[5,4-d]pyrimidine.

References Cited in the file of this patent

UNITED STATES PATENTS 2,925,418     Druey et al. _____ Feb. 16, 1960

OTHER REFERENCES

Erickson et al.: "The 1,2,3- and 1,2,4-Triazines, Tetrazines and Pentazines," page 41, Interscience Publishers, Inc., New York (1956).